(12) United States Patent
Smith

(10) Patent No.: US 8,092,858 B2
(45) Date of Patent: Jan. 10, 2012

(54) GYPSUM PANEL HAVING UV-CURED MOISTURE RESISTANT COATING AND METHOD OF MAKING SAME

(75) Inventor: Russell Smith, Covington, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 267 days.

(21) Appl. No.: 12/470,663

(22) Filed: May 22, 2009

(65) Prior Publication Data
US 2009/0223618 A1    Sep. 10, 2009

Related U.S. Application Data

(62) Division of application No. 10/733,802, filed on Dec. 12, 2003, now Pat. No. 7,553,780.

(60) Provisional application No. 60/433,021, filed on Dec. 13, 2002.

(51) Int. Cl.
*B05D 1/12* (2006.01)
*C08F 2/46* (2006.01)

(52) U.S. Cl. ........ 427/180; 428/487; 428/496; 428/508; 156/45

(58) Field of Classification Search .................. 427/180, 427/496, 508, 487; 156/45
See application file for complete search history.

(56) References Cited

U.S. PATENT DOCUMENTS

| | | | |
|---|---|---|---|
| 3,455,710 A | 7/1969 | Nitzsche et al. | |
| 3,507,684 A * | 4/1970 | Wallen ............................. | 156/44 |
| 3,623,895 A | 11/1971 | Nitzsche et al. | |
| 3,993,822 A | 11/1976 | Knauf et al. | |
| 4,136,687 A | 1/1979 | Dabroski | |
| 4,146,599 A * | 3/1979 | Lanzetta ......................... | 264/35 |
| 4,269,869 A | 5/1981 | Morohashi et al. | |
| 4,447,498 A | 5/1984 | Fink et al. | |
| 4,514,471 A | 4/1985 | Sugimoto et al. | |
| 4,643,771 A | 2/1987 | Steinbach et al. | |
| 4,647,496 A | 3/1987 | Lehnert et al. | |
| 5,096,938 A | 3/1992 | Beck et al. | |
| 5,342,680 A | 8/1994 | Randall | |
| 5,397,631 A | 3/1995 | Green et al. | |
| 5,552,187 A | 9/1996 | Green et al. | |
| 5,718,785 A | 2/1998 | Randall | |
| 6,136,383 A | 10/2000 | Schwartz et al. | |

(Continued)

FOREIGN PATENT DOCUMENTS

EP    0279303    2/1988

(Continued)

OTHER PUBLICATIONS

International Search Report for PCT/US03/39504 dated Apr. 20, 2005.

(Continued)

*Primary Examiner* — Elena T Lightfoot

(57) ABSTRACT

A method of making a gypsum panel comprises sandwiching a gypsum slurry between two moving sheets of facing material, one of said sheets comprising a fibrous facing material, curing and drying the gypsum slurry to form a set gypsum panel, applying a coating of a radiation curable formulation, which is essentially free of any unreactive components, onto the fibrous facing material of the set gypsum panel, applying a surface coating of an aggregate material onto the coating of the radiation curable formulation, and curing the coating of the radiation curable formulation with high energy radiation, wherein the radiation curable formulation comprises a high energy radiation curable polymer comprising ethylenically unsaturated double bonds.

20 Claims, 2 Drawing Sheets

U.S. PATENT DOCUMENTS

| | | | |
|---|---|---|---|
| 6,162,511 A | 12/2000 | Garnett et al. |
| 6,165,619 A | 12/2000 | Ikenaga et al. |
| 6,299,944 B1 | 10/2001 | Trapani |
| 6,316,535 B1 | 11/2001 | Caldwell et al. |
| 6,610,760 B2 | 8/2003 | Eckbert et al. |
| 2002/0134079 A1 | 9/2002 | Fillon et al. |
| 2002/0151240 A1 | 10/2002 | Smith et al. |
| 2003/0113520 A1 | 6/2003 | Takahashi et al. |
| 2003/0203191 A1 | 10/2003 | Randall et al. |
| 2004/0142115 A1 | 7/2004 | Jaworek et al. |
| 2004/0154264 A1 | 8/2004 | Colbert |
| 2005/0126430 A1 | 6/2005 | Lightner et al. |

FOREIGN PATENT DOCUMENTS

| | | | |
|---|---|---|---|
| EP | 0650979 | 10/1994 |
| EP | 1251215 A2 | 10/2002 |
| FR | 2812012 A1 | 1/2002 |
| JP | 63-154342 A | 6/1988 |
| JP | 05-148001 A | 6/1993 |
| JP | 08-009892 B | 1/1996 |
| JP | 2000107688 A | 4/2000 |
| JP | 2000-280433 A | 10/2000 |

OTHER PUBLICATIONS

European Supplemental Search Report for EP 03 81 3382 Dated Jan. 20, 2010.

* cited by examiner

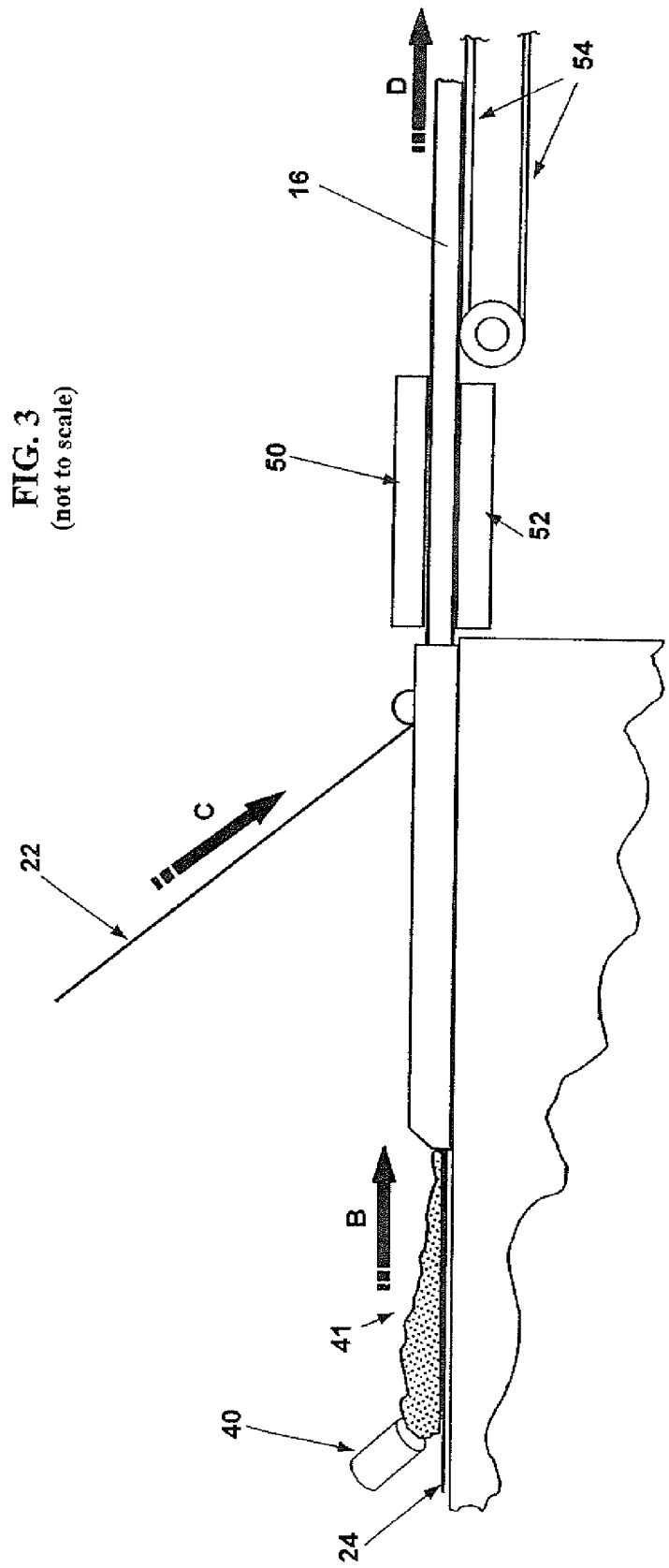

GYPSUM PANEL HAVING UV-CURED MOISTURE RESISTANT COATING AND METHOD OF MAKING SAME

CROSS REFERENCE TO RELATED APPLICATIONS

This application is a division of U.S. application Ser. No. 10/733,802, filed Dec. 12, 2003, which claims the benefit of U.S. Provisional Application Ser. No. 60/433,021, filed Dec. 13, 2002, both of which are incorporated by reference in their entirety.

FIELD OF THE INVENTION

The present invention relates to gypsum panels and, more particularly, to gypsum panels having at least one surface faced with a fibrous mat adhered to a set gypsum core, wherein the surface of the fibrous mat has a coating of a moisture resistant, radiation-cured, e.g., UV-cured, polymer coating. The present invention also relates to the method of making such a gypsum panel structure.

BACKGROUND OF THE INVENTION

Panels of gypsum wallboard having a core of set gypsum sandwiched between two sheets of facing paper have long been used as structural members in the fabrication of buildings. Such panels are typically used to form the partitions or walls of rooms, elevator shafts, stairwells, ceilings and the like. Paper facing provides a smooth surface that is especially desirable for painting or wall papering interior walls. Although paper is a relatively inexpensive facing material and is easily used in the process of manufacturing wallboard, it has certain disadvantages, particularly with regard to durability and moisture-resistance.

As an alternative to paper facing, other fibrous mats (such as glass fiber mats) also have been used as facing materials for gypsum wallboard. One example of such a wallboard is described in U.S. Pat. No. 3,993,822. Fibrous glass matting provides improved water resistance and often provides significant improvements in strength and other structural attributes. More recently, fibrous glass mats having various types of coatings also have found acceptance for use in applications requiring moisture resistance.

One specialty application for the use of panels of gypsum wallboard of this construction is in bathrooms—typically a place of high humidity and residual water because of the flow of water from the use of showers, bathtubs, and sinks. Gypsum wallboards suitable for use in these applications share a common requirement; that is a resistance or tolerance to high humidity and high moisture environments, often for prolonged periods.

A usual construction of bathroom walls includes a multi-ply structure of ceramic tile adhered to an underlying base member, for example, a panel of wallboard comprising gypsum or other material. Such a panel is referred to in the industry as a "tile backing board," which for convenience is referred to herein as "tile backer". In usual fashion, sheets of tile backer (for example, 4'×8'×½") are fastened by rust-resistant nails or screws to studs. Blocks of ceramic tiles (for example, 4"×4") are adhered to the sheets of tile backer using a water-resistant adhesive which is referred to in the industry as "mastic" or by a Portland cement-based adhesive which is referred to commonly as "thin set mortar". Thereafter, spaces between the tiles and between the tiles and other adjoining surfaces, for example, the lip of a bathtub or sink, are filled with a water-resistant material which is referred to in the industry as "grouting".

It should be appreciated that a primary goal in constructing a bathroom that includes one or more of a bathtub, shower and sink is to make the contiguous and adjacent walls watertight utilizing materials that resist being degraded by water, including hot water. Tiles made from ceramics are such materials and are basically inert to both the hot and cold water with which the tiles come into direct contact.

It is important also that the tile backer to which the tiles are adhered be water-resistant. Theoretically, it would seem that the water-resistant properties of the tile backer should be inconsequential because the backer is shielded from shower, bath and sink water by water-resistant tiles, grouting and mastic. However, experience has shown this is not the case and that moisture can and does in fact seep, in various ways, through the plies of material which overlie the tile backer.

One way has to do with the fact that grouting is not water-impervious and over time permits the seepage of moisture, a situation which is aggravated upon the formation of cracks, including hairline cracks, in the grouting. Eventually, the moisture which penetrates through the grouting finds its way through the mastic and comes into contact with the facing of the wallboard. Such facing is generally paper, typically a multi-ply paper, which upon contact with moisture tends to degrade by delaminating or otherwise deteriorating. For example, the paper facing may be subject to biological degradation from mold and mildew. The paper can actually rot away. Furthermore, as the moisture comes into contact with the underlying set gypsum core, it tends to dissolve the set gypsum and also the core adhesive, which bonds the core and paper facing together. Such adhesive is typically a starch material. The development of these conditions can lead to tiles coming loose from the underlying deteriorated paper-faced gypsum wallboard. This undesirable situation is exacerbated when hot water comes into contact with the paper-faced wallboard.

Another type of moisture condition which leads to the loosening or falling off of tiles from their underlying support substrate is associated with those segments of the multi-ply wall structure which include a joint formed from an edge portion of the wallboard. An example is the joint formed by the edge of a wallboard panel and the lip of a bathtub. Another example is the joint formed by two contiguous wallboard panels. As moisture penetrates through the multi-ply structure and reaches such a joint, it tends to wet significant portions of the paper facing and core by virtue of its spreading through capillary action. This can lead to delamination of the paper facing and/or dissolution of the core and/or the paper/core adhesive. As this occurs, tiles can come loose and fall off.

One water-resistant gypsum panel suitable for use in such moisture-prone conditions is described in U.S. Pat. Nos. 5,397,631 and 5,552,187. According to these patents, following the manufacture of a fibrous glass mat-faced gypsum panel, a surface of the panel faced with a glass mat is coated with a substantially humidity- and water-resistant resinous coating of a cured (dried) latex polymer. The coating acts as both a liquid and vapor barrier and is formed from an aqueous coating composition comprising from about 15 to about 35 wt. % of resin solids, about 20 to about 65 wt. % of filler, and about 15 to about 45 wt. % of water, applied to obtain a solids loading of about 110 lbs. per 1000 sq. ft. A preferred resin for use according to this patent is a latex polymer that has been sold by Unocal Chemicals Division of Unocal Corporation under the mark 76 RES 1018. The resin is a styrene-acrylic copolymer that has a relatively low film-forming temperature. Aqueous coatings formed from the resin are dried effectively at temperatures within the range of about 300° to 400° F. If desired, a coalescing agent can be used to lower the film-forming temperature of the resin.

While this approach produces a gypsum panel that satisfactorily solves many of the previous-mentioned problems encountered when using paper-faced gypsum panels in severe moisture environments, the added cost, due both to the cost of the resinous coating itself and the cost associated with how the coating is applied, has been an impediment to wider use of such panels.

One important embodiment of the present invention thus relates to an improved gypsum-based structural panel having a water impervious coating, such that the panel can be used effectively as a tile backer. Still other embodiments of the improved gypsum panel may have use in other applications such as in the return air installations, shaft walls and area separator walls in commercial buildings where water and humid conditions are commonly encountered. Other applications where moisture and humid conditions are likely to present difficulties either during the installation or the use of the board also will be apparent to those skilled in the art.

These and other embodiments of the invention, which relies on the provision of a radiation cured, e.g., ultraviolet (UV) cured, coating on a fibrous mat faced gypsum panel, will be apparent from the following description.

SUMMARY OF THE INVENTION

One aspect of the present invention is directed to a fibrous mat faced gypsum panel having on at least one of the facing sheets a moisture resistant, cured coating of a radiation curable, e.g., UV curable, polymer.

Another aspect of the present invention is directed to a method of preparing a fibrous mat-faced gypsum panel having the cured coating of a radiation curable, e.g., UV curable, polymer on at least one of the fibrous facing sheets.

Still another aspect of the present invention is directed to a fibrous mat faced gypsum panel having on at least one of the facing sheets a moisture resistant cured coating of a radiation curable, e.g., UV curable, polymer and an aggregate material sufficient to facilitate the bonding of tiles or other decorative surface treatments to the gypsum panel.

The cured coating provides excellent water resistance and vapor barrier properties. It also improves the durability of the surface conferring excellent abuse resistance and abrasion/scratch resistance to the coated surface. In roofing applications, the coating significantly reduces frothing often encountered when using gypsum panels in hot-mop roofing installations. Coatings containing the aggregate additive also show excellent adhesion for tile setting materials such as mortars, mastics and epoxies, yet also having exceptional resistance to blocking.

The present invention is particularly advantageous for use in applications in which the gypsum panel is expected to be exposed to a high humidity or high moisture environment during installation or use, such as in shaft walls, stairwells, area separation walls, return air installations and especially as a tile backer in bathroom applications. Still other applications and uses will become apparent from the detailed description of the invention, which appears hereinafter.

BRIEF DESCRIPTION OF THE DRAWINGS

The objects, features, and advantages of the invention will be apparent from the following more detailed description of certain embodiments of the invention and as illustrated in the accompanying drawings in which reference characters refer to the same parts throughout the various views. The drawings are not necessarily to scale, emphasis instead being placed upon illustrating the features of the invention.

FIG. 3 is a partial schematic illustration of a portion of a wallboard production line illustrating a process for making a gypsum panel.

DETAILED DESCRIPTION OF THE INVENTION

Figure 1:
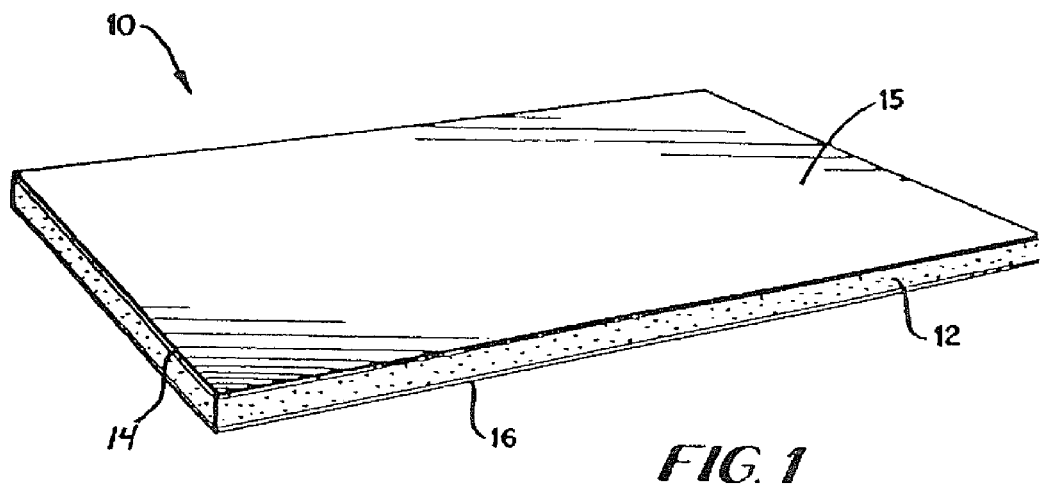
FIG. 1 is an isometric view of a gypsum panel or gypsum board having fibrous facing sheets and a coating of a cured radiation curable formulation in accordance with one embodiment of the present invention.

As shown in FIG. 1, one embodiment of a moisture-resistant gypsum panel or gypsum board of the present invention 10, having a radiation (UV) cured polymer coating 15 comprises a gypsum board core 12 faced with two fibrous facing sheets or mats, 14 and 16. Both of the fibrous facing sheets or mats may be glass fiber mats, both may be mats of paper fibers, or one may be a paper mat and the other a glass mat. Other fibrous mats suitable for use in the present invention will be apparent from the following description. For example, pre-coated glass fiber mats, such as described in U.S. Pat. Pub. 20030203191 and U.S. Pat. Pub. 20020134079 can advantageously be used as well. The surface of at least one of the mats, preferably a fibrous glass mat in the case where the panel is designed for use in a high moisture environment, is coated with a radiation-cured, e.g., UV-cured, polymer coating (indicated by the numeral 15 in FIGS. 1 and 2).

The radiation cured coating is applied using a formulation that preferably is essentially free of any unreactive components. The coating is typically applied following the initial preparation of the panel and the coated panel then is exposed to a radiation (UV) source to cure the coating on the fibrous facing sheet.

In one preferred embodiment, the gypsum panel is initially prepared using, as at least one of the facing sheets, a pre-coated glass mat having a dried (heat cured) aqueous coating composition containing a combination (e.g., a mixture) of a mineral pigment (filler); a first binder of a polymer latex adhesive and, optionally a second binder of an inorganic adhesive. Such a construction is described, for example, in co-pending U.S. application Ser. No. 09/837,226 filed Apr. 19, 2001, the entirety of which is incorporated herein by reference.

Following initial preparation of the gypsum panel, the radiation curable formulation (e.g., UV curable formulation) then is applied as a coating onto the pre-coated mat side of the gypsum panel and exposed to a radiation (UV) source to effect cure of the radiation (UV) curable coating.

There are numerous advantages associated with the use of the present invention. Of primary importance is that the radiation cured polymer-coated fibrous mat-faced panel has superior weathering characteristics, and accordingly, can be used effectively for indefinite periods of time as a stable substrate in applications involving water contact and high humidity exposure, either in the initial installation of the panel or during its use. A radiation-cured polymer-coated glass mat-faced panel of the present invention is mold-resistant and rot-resistant.

The cured coating provides excellent water resistance and vapor barrier properties. It also improves the durability of the surface conferring excellent abuse resistance and abrasion/scratch resistance to the coated surface. In roofing applications, the coating significantly reduces frothing often encountered when using gypsum panels in hot-mop roofing installations. Coatings containing an aggregate additive also show excellent adhesion for tile setting materials such as mortars, mastics and epoxies, yet also exhibit exceptional resistance to blocking.

Gypsum board is typically manufactured by a method that includes dispersing a gypsum slurry onto a moving sheet of fibrous facer. The fibrous facer typically is supported by equipment such as forming tables, support belts, carrier rolls and/or the like. Usually a second sheet of fibrous facer is then fed from a roll onto the top of the slurry, thereby sandwiching the slurry between two moving fibrous facer sheets. Forming or shaping equipment is utilized to compress the slurry to the desired thickness. The gypsum slurry is allowed to at least partially set and then sequential lengths of board are cut and further processed by exposure to heat, which accelerates the drying of the board by increasing the rate of evaporation of excess water from the gypsum slurry.

FIG. 3 is a schematic drawing of a portion of a manufacturing line for producing gypsum panels. The specific details of such a configuration are conventional and thus are provided only by a schematic representation. In conventional fashion, dry ingredients from which the gypsum core is formed are pre-mixed and then fed to a mixer of the type commonly referred to as a pin mixer (not shown). Water and other liquid constituents, such as soap, used in making the core are metered into the pin mixer where they are combined with the desired dry ingredients to form an aqueous gypsum slurry 41, which emerges from a discharge conduit 40 of the pin mixer. Foam (soap) is generally added to the slurry to control the density of the resulting core. The slurry is deposited through one or more outlets of the discharge conduit 40 onto a horizontally moving continuous web of fibrous facing material 24 (such as multi-ply papers or a pre-coated fibrous glass mat). The amount deposited can be controlled in manners known in the art.

Fibrous facing material 24 is fed from a roll (not shown), and if pre-coated, with the coated side down. Prior to receiving the gypsum slurry 41, the web of fibrous facing material 24 is flattened by rollers (not shown) and usually is scored by one or more scoring devices (not shown). Scoring allows the sides of fibrous facing material 24 to be folded upward and around the edges of the gypsum panel. Fibrous facing material 24 and the deposited gypsum slurry 41 move in the direction of arrow B. The moving web of fibrous facing material 24 will form the second facing sheet of the panel being fabricated, and the slurry at least partially (and preferably, only partially) penetrates into the thickness of the fibrous facing material and sets. On setting, a strong adherent bond is formed between the set gypsum and the fibrous facing sheet. The partial penetration of the slurry into the fibrous facing sheet can be controlled according to methods known in the art such as, for example, controlling the viscosity of the slurry and by applying various coatings to the fibrous facing.

The gypsum core of the panel of the present invention is basically of the type used in gypsum structural products commonly known as gypsum wallboard, dry wall, gypsum board, gypsum lath and gypsum sheathing. The core of such a product is formed by mixing water with powdered anhydrous calcium sulfate or calcium sulfate hemi-hydrate ($CaSO_4 \cdot \frac{1}{2}H_2O$), also known as calcined gypsum, to form an aqueous gypsum slurry, and thereafter allowing the slurry mixture to hydrate or set into calcium sulfate dihydrate ($CaSO_4 \cdot 2H_2O$), a relatively hard material. The core of the product will in general comprise at least about 75-85 wt % of set gypsum, though the invention is not limited to any particular content of gypsum in the core.

After the gypsum slurry 41 is deposited upon the web of fibrous facing mat material 24, the edges of that web are progressively folded (using equipment well-known to those skilled in the art) around the edges of the forming panel or wallboard, and terminate on the upper surface of the slurry along the sides. Another web of fibrous facing material, e.g., paper 22, fed in the direction of arrow C from a roll (not shown), usually is applied to the upper surface of the gypsum slurry 41, and usually only slightly overlaps the folded-around edges of the (bottom) web of fibrous facing material 24. Of course, any facing sheet suitable for use a facing sheet 24 can also be used for facing sheet 22. Prior to applying the (top) web of fibrous facing material, such as paper 22, to the upper surface of the gypsum slurry, glue is applied to the web along portions of the web that will overlap and be in contact with the folded-over edges of the bottom fibrous facing sheet (glue application is not shown). Preferably non-starch-based glues are used. One suitable glue is a poly(vinyl alcohol) latex glue. Glues based on vinyl acetate polymers, especially vinyl acetate that has been hydrolyzed to form a polyvinyl alcohol, are widely available commercially as white glues. Various configurations may be used for feeding and joining the webs.

After the (top) web of facing material, such as paper 22, is applied, the "sandwich" of fibrous facing material web, gypsum slurry and second fibrous facing material web are pressed to the desired wallboard thickness between plates 50 and 52. Alternatively, the webs and slurry can be pressed to the desired thickness with rollers or in another manner. The continuous sandwich of slurry and applied facing materials then is carried by conveyor(s) 54 in the direction of arrow D. Slurry 41 sets as it is carried along.

As noted above, the gypsum panel of the present invention is faced with at least one and preferably a second facer sheet of a fibrous mat. A suitable fibrous mat comprises a mat of fibrous material that is capable of forming a strong bond with the set gypsum comprising the core of the gypsum wallboard. Non-limiting examples of such fibrous mats are mats made from (1) paper (cellulose) fibers (2) mineral-type materials such as glass fibers, (3) synthetic resin fibers, such as polyolefin fibers and (4) blends of fibers, such as blends of mineral fibers and synthetic resin fibers. Glass fiber mats are normally preferred for panels that are slated to be used in severe moisture environments. Fibrous mats based on paper fibers generally consist of multi-ply constructions, while glass fiber mats are often of a single-ply construction.

As noted above, either or both of the facer sheets can be a paper facer sheet, a fibrous glass mat facer sheet, a fibrous synthetic resin mat facer sheet, or a facer sheet made from a blend of fibers, such as a blend of glass and synthetic resin fibers. Preferably, for high moisture applications, at least one of the facer sheets is a fibrous glass mat facer sheet and more preferably a pre-coated fibrous glass mat, such as the pre-coated mat disclosed in co-pending application Ser. No. 837,226. Thus, in some of the contemplated embodiments of the present invention the gypsum panel can have, by way of example, a set gypsum core covered by two paper facers, two fibrous glass mat facers, or one paper facer and one fibrous glass mat facer. The terms "first facer" and "second facer" are arbitrary in that each term can refer either to a top layer or a backing layer of the gypsum panel.

Suitable facer sheets made from paper fibers include those commonly used for the face sheet of conventional wallboard products. Such paper products are well known to those skilled in the art. One example of a suitable paper facer sheet is an ivory paper (multi-ply) having hard internal sizing (100% through) of 1000 to 3500; a basis weight of about 54 to 56 pounds per 1000 square feet; an overall caliper of about 0.013 inches; a tensile strength of about 70 lbs/inch (machine direction) and about 23 lbs/inch (cross direction); a top liner Cobb surface wetting of about 1.00 to about 1.50 grams and bottom liner Cobb surface wetting of about 0.50 to about 1.50 grams; and a porosity of about 15 sec. to about 150 sec. Other suitable papers for making gypsum wallboard are well known to those skilled in the art.

Suitable fibrous mats, made in part from mineral fibers and/or synthetic resin fibers, can comprise continuous or discrete strands or fibers and can be woven or nonwoven in form. Such constructions are commercially available.

Nonwoven glass mats such as made from chopped strands and continuous strands can be used satisfactorily and are less costly than woven materials. The strands of such glass mats typically are bonded together to form a unitary structure by a suitable adhesive. A glass fiber mat can range in thickness, for example, from about 10 to about 40 mils, with a mat thickness of about 15 to about 35 mils generally being suitable. The aforementioned fibrous glass mats are known and are commercially available in many forms. While nonwoven fibrous mats will often be preferred because of their lower cost, woven fibrous mats may be desirable in certain specialized instances and thus also are contemplated for use in connection with the present invention.

One suitable fibrous glass mat is a fiberglass mat comprising chopped, nonwoven, fiberglass filaments oriented in a random pattern and bound together with a resin binder, typically a urea-formaldehyde-based resin adhesive. Fiber glass mats of this type are commercially available, for example, such as those which have been sold under the trademark DURA-GLASS by Manville Building Materials Corporation and those which have been sold by Elk Corporation as BUR or shingle mat. An example of such a mat is nominally 33 mils thick and incorporates glass fibers about 13 to 16 microns in diameter. Although certain structural applications may utilize a thicker mat and thicker fibers, a glass fiber mat nominally 20 mils thick, which includes glass fibers about 10 microns in diameter, is also suitable for use in the present invention. Glass mats suitable for use in the present invention have a basis weight that is usually between about 10 and 30 lbs. per thousand square feet of mat surface area.

Typically, but not exclusively, glass fiber mats are wet-formed into a continuous non-woven web of any workable width on a Fourdrinier-type machine. Preferably, an upwardly inclining wire having several linear feet of very dilute stock lay-down, followed by several linear feet of high vacuum water removal, is used. This is followed by a "curtain coater," which applies the glass fiber binder and an oven that removes excess water and cures the adhesive to form a coherent mat structure.

After being formed and sufficiently set, the wallboard is typically cut to desired lengths and dried. The drying follows the initial hydration and is ultimately aided by heating, which causes excess water to evaporate through the fibrous facing sheets or mats as the calcined gypsum hydrates and sets. Thus, the fibrous facing sheets or mats must be sufficiently porous to permit the passage of water vapor at this stage required for adequate drying. Drying conditions typically used in conventional continuous gypsum board manufacture include temperatures of about 200° to about 600° F., with drying times of about 30 to about 60 minutes, at line speeds of about 70 to about 600 linear feet per minute. Of course, any combination of drying time and drying temperature for obtaining a suitable gypsum board product can be used and the above parameters are simply exemplary.

After this initial preparation of the wallboard, the water-resistant coating is applied to at least one, or alternatively both of the faces of the wallboard.

Figure 2:
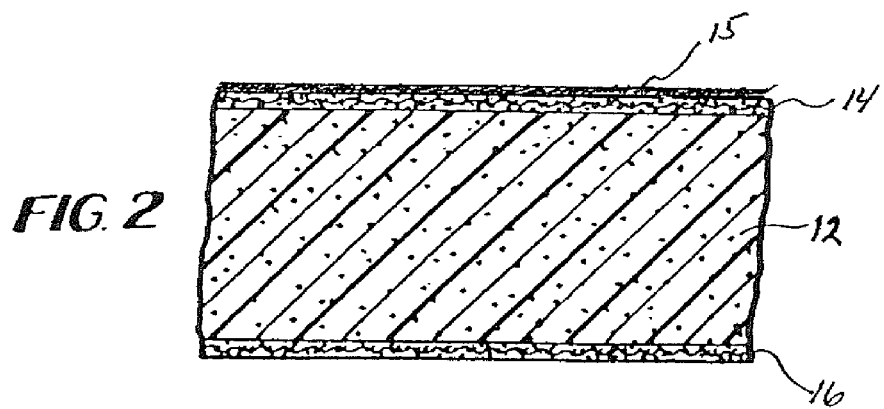
FIG. 2 is a cross-sectional view of the moisture resistant panel of FIG. 1.

The resulting gypsum board is schematically illustrated in FIGS. 1 and 2. The board has a set gypsum core 12 with the first 16 and second 14 fibrous facer sheets adhered thereto by the partially penetrating gypsum core. Generally, the core will have voids (shown as individual dots) distributed there though as a consequence of the foam added to the gypsum slurry during board manufacture to reduce its density.

The composition from which the set gypsum core of the structural panel is made can include a variety of additives, such as set accelerators, set retardants, foaming agents, reinforcing fibers, and dispersing agents. In addition, a viscosity control agent may be added to adjust the viscosity of the slurry. Examples of viscosity control agents are described in U.S. Pat. No. 4,647,496. Other typical additives include water-resistant additives and fire-resistant additives. A variety of additives for improving water-resistant properties of a gypsum core are described, for example, in U.S. Pat. No. 5,342,680, including a mixture of polyvinyl alcohol and a wax-asphalt emulsion. In one embodiment, described in more detail below, the water-resistance of the wallboard is such that it absorbs less than about 10%, preferably less than about 7.5%, and most preferably less than about 5% water when tested in accordance with the immersion test of ASTM method C-473.

To reduce the weight (density) of the core, it also has been common practice to introduce small bubbles into the gypsum to produce a foamed gypsum core. Foaming agents or soaps, typically long-chained alkyl sulfonates, are conventionally added for this purpose. One adverse consequence of the normal addition of soaps into gypsum slurry is a reduction in the strength of the bond between the cured gypsum core and the paper facers. To counteract this effect, a starch binder normally is added to the gypsum slurry.

More recently, improved gypsum wallboard constructions have been developed. In one approach, the gypsum board is prepared with a pre-coated glass fiber mat, wherein the coating comprises a dried aqueous mixture of a mineral pigment (filler); a first binder comprised of a polymer latex adhesive; and, optionally a second binder comprised of an inorganic adhesive. A wallboard of this type is described in pending U.S. application Ser. No. 09/837,226 filed on Apr. 19, 2001, the entire disclosure of which is hereby incorporated by reference. In another construction, the gypsum core is covered with a glass fiber mat (preferably a pre-coated glass mat, such as described in the just-referenced application) on one face, and with a paper sheet on the opposite face. This wallboard is described in pending U.S. application Ser. No. 10/245,505 filed on Sep. 18, 2002, the entire disclosure of which also is hereby incorporated by reference.

Wallboards may contain wax or a wax emulsion as an additive to improve the water resistance of the gypsum core. The invention is not limited thereby, however, and examples of other materials which have been reported as being effective for improving the water-resistant properties of gypsum products include metallic resinates; wax or asphalt or mixtures thereof, usually supplied as an emulsion; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogen-polysiloxanes; siliconates, such as available from Dow Corning as Dow Corning 772; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. The siliconates are normally used in an amount of from about 0.05% to about 0.4%, more usually in an amount of about 0.1%. Mixtures of these additives can also be employed.

Species of wax emulsions and wax-asphalt emulsions used to improve wallboard water resistance are commercially available. The wax portion of these emulsions is preferably a paraffin or microcrystalline wax, but other waxes also can be used. If asphalt is used, it in general should have a softening point of about 115° F., as determined by the ring and ball method. The total amount of wax and wax-asphalt in the aqueous emulsions will generally comprise about 50 to about 60 wt % of the aqueous emulsion. In the case of wax-asphalt emulsions, the weight ratio of asphalt to wax usually varies from about 1 to 1 to about 10 to 1. Various methods are known for preparing wax-asphalt emulsions, as reported in U.S. Pat. No. 3,935,021. Commercially available wax emulsions and wax-asphalt emulsions that can be used in the gypsum composition described herein have been sold by United States Gypsum Co. (Wax Emulsion), by Monsey Products (No. 52 Emulsion), by Douglas Oil Co. (Docal No. 1034), by Conoco (No. 7131 and Gypseal II) and by Monsey-Bakor (Aqualite 70). The amount of wax emulsion or wax-asphalt emulsion used to provide water resistant characteristics to the gypsum core often can be within the range of about 3 to about 10 wt %, preferably about 5 to about 7 wt %, based on the total weight of the ingredients of the composition from which the set gypsum core is made.

Another water-resistant additive for use in the core of the gypsum-based core is an organopolysiloxane, for example, of the type referred to in U.S. Pat. Nos. 3,455,710; 3,623,895; 4,136,687; 4,447,498; and 4,643,771. One example of this type of additive is poly(methyl-hydrogen-siloxane). When used, the amount of the organopolysiloxane usually is at least about 0.2 wt % and often falls within the range of about 0.3 to about 0.6 wt %.

Unless stated otherwise, the term "wt %" as used herein in connection with the gypsum core means weight percent based on the total weight of the ingredients of the composition from which the set gypsum core is made, including any water of the wax or wax-asphalt emulsion, but not including additional amounts of water that are added to the gypsum composition for forming an aqueous slurry thereof.

In accordance with another embodiment, polyvinyl alcohol may used as a binder in an effective amount to promote adhesion between the set gypsum core and the adjacent facer sheet(s), avoiding the need to use in the gypsum core, starch or other conventional binders. This is described in co-pending U.S. application Ser. No. 10/224,591 filed on Aug. 21, 2002, the disclosure of which is incorporated herein by reference Typically, the core of the gypsum board has a density of about 35 to about 55 lbs./ft$^3$, more usually about 40 to about 50 lbs./ft$^3$. Of course, cores having both higher and lower densities can be used in particular applications if desired. The manufacture of cores of predetermined densities can be accomplished by using known techniques, for example, by introducing an appropriate amount of foam (soap) into the aqueous gypsum slurry from which the core is formed or by molding.

Radiation (e.g., UV) curable formulations suitable for forming a liquid and vapor impervious coating of the present invention typically comprise at least one polymer which has ethylenically unsaturated double bonds. This polymer is generally supplied in an amount between about 20 and 99 wt. % of the total formulation weight. In addition, the formulation preferably is essentially free of any non-reactive (volatile) diluents or non-reactive solvents. In this way, there is no need to apply heat to the panel to remove non-reactive constituents from the coating during the curing step and essentially all of the radiation curable formulation becomes the radiation cured coating. As used in this specification and in the claims, the term "essentially free" means an amount of non-reactive components that constitutes such a small proportion of the radiation curable formulation that special provisions do not have to be provided for its removal (e.g., added heat to dry the coating) and by remaining in the coating, the desired properties of the coating are not adversely impacted.

Productivity of a modern industrial process is very important. The almost instantaneous curing obtained by using a formulation that is essentially 100% non-volatile also minimizes the time between application of the coating formulation and obtaining a coated gypsum panel that can be handled for inventory or distribution. This allows the gypsum panel to be coated on-line, shortly after exiting the conventional drying ovens.

In accordance with the present invention, the formulation is applied to at least one of the fibrous facing sheets or mats of the gypsum panel and then is cured by exposure to high-energy radiation, for example by irradiating with UV light of wavelength in the range from 250 to 400 nm or possibly in the alternative by irradiating with high-energy electrons (electron beams; from 100 to 350 keV). In some applications, heat may be sufficient to cause effective crosslinking of the reactive components of the formulation, or may be used in conjunction with the above-noted high-energy radiation.

Polymers suitable for the radiation-curable formulation of the invention are, in principle, any polymer which has ethylenically unsaturated double bonds which can undergo free-radical polymerization on exposure to electromagnetic radiation, such as UV radiation or electron beams. As understood by those skilled in the art, the content of ethylenically unsaturated double bonds in the polymer must be sufficient to ensure effective crosslinking of the polymer. Generally, a content of ethylenically unsaturated double bonds in the range from 0.01 to 1.0 mol/100 g of polymer, usually from 0.05 to 0.8 mol/100 g of polymer and most often from 0.1 to 0.6 mol/100 g of polymer will be sufficient.

As used throughout the specification and claims, the term "polymer" is intended to encompass materials containing ethylenically unsaturated double bonds commonly referred to in the art as polycondensates, polyaddition products, chemically modified polymers, oligomers and prepolymers. Suitable polymers often are obtained by reacting polyfunctional compounds having at least three reactive groups with other monofunctional or polyfunctional compounds, which can react with the polyfunctional compounds having at least three reactive groups, with one or more of the compounds having ethylenically unsaturated double bonds that remain after the reaction.

Suitable polymers generally have acryloxy, methacryloxy, acrylamido or methacrylamido groups, which may be bonded to the backbone of the polymer directly or through an alkylene groups. Such polymers generally include silicones, polyurethanes, polyesters, polyethers, epoxy resins, melamine resins and (meth)acrylate-based polymers and copolymers, having in each case ethylenically unsaturated groups. Polymers having acryloxy and/or methacryloxy groups are most common. Such polymers often are called silicone acrylates, polyurethane acrylates, acrylate-modified polyesters or polyester acrylates, epoxy acrylates, polyether acrylates, melamine acrylates and acrylate-modified copolymers based on (meth)acrylates. It also is possible to use ethylenically unsaturated polyesters as the radiation curable polymer.

The silicones having ethylenically unsaturated double bonds are generally linear or cyclic polydimethylsiloxanes that have allyl, methallyl, acryloyl or methacryloyl groups. The ethylenically unsaturated groups are bonded to the silicon atoms of the main backbone of the polydimethylsiloxane directly, via an oxygen atom, or via an alkylene group which is linear or branched and may be interrupted by one or more non-adjacent oxygen atoms. Acrylate and/or methacrylate groups are introduced into such silicones, for example, by esterifying Si—OH groups in the polydimethylsiloxanes with an appropriate acid chloride or an alkyl ester of the acid, for example the ethyl esters and methyl esters. Another method is to hydrosilylate the propynyl esters of ethylenically unsaturated carboxylic acids with dimethylchlorosilane and then react the chloroorganosilicon compound obtained in this fashion with a polydimethylsiloxane containing hydroxyl groups. Another functionalization method starts from polydimethylsiloxanes which have an ω-chloroalkyl group on a silicon atom, for example 3-chloropropyl or 2-methyl-3-chloropropyl. Such compounds may be modified with ethylenically unsaturated compounds containing hydroxyl groups in the presence of suitable bases, for example tertiary amines, such as triethylamine, to give ethylenically unsaturated polysiloxanes. Examples of ethylenically unsaturated compounds containing hydroxyl groups are the esters of ethylenically unsaturated carboxylic acids with polyhydroxy compounds, eg. hydroxyalkyl acrylates and hydroxyalkyl methacrylates, such as hydroxyethyl (meth)acrylate, hydroxypropyl (meth)acrylate, 3-hydroxy-2,2-dimethylpropyl (met)acrylate, trimethylolpropane di(meth)acrylate and pentaerythritol di- or tri(meth)acrylate.

The ethylenically unsaturated silicones mentioned are well known to the person skilled in the art and are generally commercially available.

Ethylenically unsaturated epoxy resin derivatives suitable for use in the radiation curable formulations encompass in particular the reaction products of epoxy-group-containing compounds or oligomers with ethylenically unsaturated monocarboxylic acids, such as acrylic acid, methacrylic acid, crotonic acid and cinnamic acid. Instead of, or together with the monocarboxylic acids, it is also possible to use the monoesters of ethylenically unsaturated dicarboxylic acids with monoalcohols, such as methanol, ethanol, n-propanol, isopropanol, n-butanol, tert-butanol, n-hexanol and 2-ethylhexanol. Suitable epoxy-group-containing substrates encompass in particular the polyglycidyl ethers of polyhydric alcohols. These include the diglycidyl ethers of bisphenol A and of its derivatives, and moreover the diglycidyl ethers of oligomers of bisphenol A, obtained by reacting bisphenol A with the diglycidyl ether of bisphenol A, and furthermore the polyglycidyl ethers of novolacs. The reaction products of the ethylenically unsaturated carboxylic acids with the glycidyl ethers under consideration may be modified with primary or secondary amines. It is moreover possible to introduce further ethylenically unsaturated groups into the epoxy resin by reaction of hydroxyl groups in epoxy resins with suitable derivatives of ethylenically unsaturated carboxylic acids, eg. acid chlorides. Ethylenically unsaturated epoxy resins are well known to the person skilled in the art and are commercially available.

Examples of ethylenically unsaturated melamine resins suitable as the radiation curable polymer are the reaction products of melamine-formaldehyde condensation products with compounds containing hydroxyl groups, with ethylenically unsaturated dicarboxylic anhydrides, or with the amides of ethylenically unsaturated monocarboxylic acids. Suitable melamine-formaldehyde condensation products are in particular hexamethylolmelamine (HMM) and hexamethoxymethylolmelamine (HMMM). Suitable hydroxyl-group-containing compounds encompass, for example, the hydroxyalkyl esters of ethylenically unsaturated carboxylic acids, in particular of acrylic acid and methacrylic acid. Other possible compounds for the reaction with HMM are ethylenically unsaturated alcohols, such as allyl alcohol and crotyl alcohol. Other suitable compounds for such reactions are ethylenically unsaturated dicarboxylic anhydrides, such as maleic anhydride. It also is possible to modify either HMM or HMMM with the amides of ethylenically unsaturated carboxylic acids, eg. acrylamide or methacrylamide, to give ethylenically unsaturated melamine resins. Such melamine resins also are well known.

Ethylenically unsaturated polymers suitable for preparing a radiation curable formulation for use in this invention may also include polyesters that contain ethylenically unsaturated double bonds. A distinction can be made here between, materials identified as ethylenically unsaturated polyesters which are obtained by copolycondensation of conventional dicarboxylic acids together with ethylenically unsaturated dicarboxylic acids and/or with anhydrides of these acids and with low-molecular-weight diols, and on the other hand ethylenically modified polyesters obtained by derivatizing free hydroxyl groups in conventional polyesters. The hydroxyl groups may be derivatized separately or during the preparation of the hydroxyl group-containing polyester.

Ethylenically unsaturated polyesters encompass in particular the copolycondensates of maleic anhydride with at least one other dicarboxylic acid and/or their anhydride(s) and a low-molecular-weight diol. In this case, the dicarboxylic acids and/or their anhydrides are preferably selected from the class consisting of succinic acid, succinic anhydride, glutaric acid, glutaric anhydride, adipic acid, phthalic acid, terephthalic acid, isophthalic acid and in particular phthalic anhydride. Suitable diols can be selected from the class consisting of ethylene glycol, 1,2-propylene glycol, 1,4-butanediol, 1,5-pentanediol, neopentyl glycol and 1,6-hexanediol, in particular 1,2-propylene glycol.

Suitable hydroxyl-group-containing polyesters for derivatization giving ethylenically modified polyesters may be prepared in a usual manner by polycondensation of di- or polybasic carboxylic acids with dihydric alcohols and/or at least one other polyhydric alcohol component. Possible di- or polybasic carboxylic acids in this case are aliphatic and aromatic carboxylic acids and their esters and anhydrides. These include succinic acid, succinic anhydride, glutaric acid, glutaric anhydride, adipic acid, pimelic acid, suberic acid, azelaic acid, sebacic acid, phthalic acid, phthalic anhydride, isophthalic acid, terephthalic acid, tetrahydrophthalic acid, tetrahydrophthalic anhydride, trimellitic acid, trimellitic anhydride, pyromellitic acid and pyromellitic anhydride. Examples of possible dihydric alcohols are ethylene glycol, propylene glycol, 1,4-butanediol, 1,5-pentanediol, neopentyl glycol, 1,6-hexanediol, 2-methyl-1,5-pentanediol, 2-ethyl-1, 4-butanediol, dimethylol-cyclohexane, diethylene glycol, triethylene glycol, mixtures of these, and also polyaddition polymers of cyclic ethers, such as polytetrahydrofuran, polyethylene glycol and polypropylene glycol. Possible polyhydric alcohols include tri- to hexahydric alcohols, such as glycerol, trimethylolethane, trimethylolpropane, trimethylolbutane, pentaerythritol, ditrimethylolpropane, sorbitol, erythritol and 1,3,5-trihydroxybenzene. If the total number of hydroxyl groups in the alcohol component molecule is larger than the total number of carboxyl groups in the acid component molecule, a hydroxyl-group-containing polyester is obtained. These hydroxyl groups may be esterified in a known manner by usual processes with the abovementioned ethylenically unsaturated carboxylic acids, in particular acrylic and methacrylic acids. The water formed during the esterification reaction may be removed, for example, by dehydrating agents, by extraction or by azeotropic distillation. The esterification usually takes place in the presence of a catalyst, eg. a strong acid, such as sulfuric acid, anhydrous hydrogen chloride, toluenesulfonic acid and/or acid ion exchangers. It also is possible to etherify the hydroxyl groups in the polyester with reactive, ethylenically unsaturated compounds, eg. with allyl chloride or methallyl chloride. Still another embodiment relates to polyesters made from diols, dicarboxylic acids and at least one carboxylic acid of higher basicity. In this case, the hydroxyl groups are introduced into the polyester subsequently by reacting the carboxylic acids groups with alkylene oxides, such as ethylene oxide or propylene oxide. These alcohol moieties may then be esterified or etherified in the same manner. These products are well known to the person skilled in the art and are commercially available. Their number-average molecular weight is generally in the range from 500 to 10,000 and more usually from 800 to 3,000.

Other ethylenically modified polyesters that can be used to make the radiation curable formulation of the present invention are polyesters obtained by co-condensing conventional di- or polycarboxylic acids with conventional alcohol components along with ethylenically unsaturated monocarboxylic acids, preferably acrylic and/or methacrylic acid. Such polymers are known, for example, from European Patent 279 303, to which reference is hereby made for further details. In this case, the ethylenically unsaturated groups are introduced into the polyester during the construction of the polyester from its low-molecular-weight components.

As noted above, the radiation curable polymer may also be selected from ethylenically unsaturated polyethers. Ethylenically unsaturated polyethers are prepared from a main structure of polyether to have terminal unsaturated groups. The main structure of a polyether is obtained, for example, by reacting a di- or polyhydric alcohol, for example an alcohol mentioned above as a di- or polyol component for preparing polyesters, with an epoxide, usually with ethylene oxide and/or propylene oxide. This main structure of polyether contains free hydroxyl groups, which may then be converted in the manner described above into allyl, methallyl, crotyl or phenylallyl groups or may be esterified with ethylenically unsaturated carboxylic acids, in particular acrylic and/or methacrylic acid, or with suitable derivatives, such as acid chlorides, $C_1$-$C_4$-alkyl esters or anhydrides.

The radiation curable polymer also may be an ethylenically unsaturated copolymer based on (meth)acrylates. Such ethylenically unsaturated copolymers are generally obtained by reacting a functionalized polymer, i.e. a polymer that has a free hydroxyl, carbonyl, carboxyl, isocyanate, amino and/or epoxy group. The ethylenic double bonds are generally introduced into the structure by reacting the polymer with a suitable, low-molecular-weight, ethylenically unsaturated compound which has a functional group which can react with the reactive group in the polymer, developing a covalent bond.

The functionalized polymers used as a starting material for such polymers are generally obtained by free-radical polymerization of at least one ethylenically unsaturated monomer having a functional group of the type mentioned above and, if desired, other ethylenically unsaturated comonomers. The ethylenically unsaturated monomer with a functional group generally makes up from 5 to 50 mol %, more usually from 15 to 40 mol % and most often from 20 to 35 mol %, of the total monomers to be polymerized. Examples of monomers with a functional group are hydroxyalkyl acrylates and hydroxyalkyl methacrylates, such as 2-hydroxyethyl (meth)acrylate, hydroxypropyl (meth)acrylate and 4-hydroxybutyl (meth) acrylate, aminoalkyl acrylates and aminoalkyl methacrylates, such as 2-aminoethyl (meth)acrylate, carbonyl compounds, such as acrolein, methacrolein, vinyl ethyl ketone, N-diacetoneacrylamide and methacrylamide, vinyl isocyanate, dimethyl-3-isopropenylbenzyl isocyanate, 4-isocyanatostylene, and isocyanates of ethylenically unsaturated carboxylic acids, eg. methacryloyl isocyanate, ω-isocyanatoalkyl (meth) acrylate, glycidyl compounds, such as glycidyl allyl and glycidyl methallyl ethers, the glycidyl esters of ethylenically unsaturated carboxylic acids, such as glycidyl (meth)acrylate, ethylenically unsaturated anhydrides, such as maleic anhydride and methacrylic anhydride and the amides of ethylenically unsaturated carboxylic acids, such as acrylamide and methacrylamide. Suitable comonomers are generally selected from the class consisting of esters of acrylic and of methacrylic acid and, if desired, vinylaromatic compounds. Examples of suitable comonomers are the $C_1$-$C_4$ esters of acrylic and methacrylic acids, such as methyl (meth)acrylate, ethyl (meth)acrylate, n-propyl (meth)acrylate, isopropyl (meth)acrylate, n-butyl (meth)acrylate, isobutyl (meth)acrylate and tert-butyl (meth)acrylate. Other suitable comonomers are styrene, 1-methylstyrene, 4-tert-butylstyrene and 2-chlorostyrene. To a lesser extent, it is also possible to use monomers such as vinyl acetate, vinyl propionate, vinyl chloride, vinylidene chloride, conjugated dienes, such as butadiene and isoprene, vinyl ethers of $C_1$-$C_{20}$ alkanols, eg. vinyl isobutyl ether, acrylonitrile, methacrylonitrile and heterocyclic vinyl compounds, such as 2-vinylpyridine and N-vinylpyrrolidone. A well-known embodiment encompasses, as comonomers, at least one monomer selected from the class consisting of the esters of methacrylic acid, in particular methyl methacrylate, and at least one further comonomer, selected from the class consisting of the alkyl esters of acrylic acid, and/or styrene.

The ethylenically unsaturated compounds that have a functional group and are suitable for the above-described reaction are often selected from the abovementioned ethylenically unsaturated monomers with a functional group. A precondition is that the functionality of the ethylenically unsaturated compound be able to react with the functionalities on the polymer, with bond formation with the polymer. Suitable reactions are condensation and addition reactions. Examples of suitable functional interactions are isocyanate-hydroxyl, isocyanate-amino, anhydride-hydroxyl, anhydride-amino, carbonyl-amino, carboxylic acid chloride-hydroxyl, glycidyl-hydroxyl, glycidyl-amino or amide and glycidyl-carboxyl. In another well known embodiment, the ethylenically unsaturated polymer is obtained by reacting a functionalized polymer having glycidyl groups with ethylenically unsaturated compounds having hydroxyl groups, in particular the hydroxyalkyl esters of the abovementioned ethylenically unsaturated carboxylic acids, eg. 2-hydroxyethyl acrylate. Examples of such ethylenically unsaturated polymers are found in European Patent 650 979, the disclosure of which is incorporated herein by reference.

Another suitable type of polymer for use in the radiation curable formulation of the present invention are polyurethane derivatives having ethylenically unsaturated double bonds. Such polyurethanes can be obtained, for example, by reacting isocyanate-containing polyurethanes with ethylenically unsaturated compounds which themselves have at least one functional group reactive with the isocyanate moiety, for example primary or secondary amino or a hydroxyl. Examples of suitable ethylenically unsaturated compounds having an amino or hydroxyl group are, in particular, the abovementioned esterification products of ethylenically unsaturated carboxylic acids with di- or polyols where at least one hydroxyl group remains unesterified. Examples of such compounds include, in particular hydroxyalkyl (meth)acrylates, such as hydroxyethyl (meth)acrylate, hydroxypropyl (meth)acrylate, butanediol mono(meth)acrylate, partial esterification products of polyhydric alcohols with acrylic and/or methacrylic acid, eg. trimethylolpropane mono- and di(meth)acrylate, pentaerythritol di- and tri(meth)acrylate, and also the corresponding aminoalkyl esters and hydroxyalkylamides, such as N-hydroxyalkyl(meth)acrylamides and 3-aminoalkyl (meth)acrylates.

Polyurethanes containing isocyanate groups can be obtained in the well-known manner by reacting aliphatic and/or aromatic di- or polyisocyanates as one (first) component with compounds having hydroxyl groups as the other (second) component. The concomitant use of polyamines and aminoalcohols as the second component is also possible to a lesser extent. As those skilled in the art understand, if amines and/or aminoalcohols are used, the resultant polyurethanes have urea groups. The number of isocyanate groups in the polyurethane is controlled, in a known manner, via the ratio of molar amounts of the starting materials.

Ethylenically unsaturated moieties may be introduced subsequently into the polyurethane containing isocyanate groups in a known manner by the functional inter-reactions previously described. It is also possible to use ethylenically unsaturated compounds with functionalities reactive with isocyanate groups directly as a third component in preparing the polyurethanes.

Examples of the di- or polyisocyanates are straight-chain or branched alkylene diisocyanates of 4-12 carbon atoms, cycloaliphatic diisocyanates with from 6 to 12 carbon atoms, aromatic diisocyanates with from 8 to 14 carbon atoms, polyisocyanates having isocyanurate groups, uretdione diisocyanates, polyisocyanates having biuret groups, polyisocyanates having urethane groups and/or allophanate groups, polyisocyanates containing oxadiazinetrione groups, uretoneimine-modified polyisocyanates or mixtures of these.

Examples of diisocyanates are tetramethylene diisocyanate, hexamethylene diisocyanate(1,6-diisocyanatohexane), octamethylene diisocyanate, decamethylene diisocyanate, dodecamethylene diisocyanate, tetradecamethylene diisocyanate, trimethylhexane diisocyanate and tetramethylhexane diisocyanate, and cycloaliphatic diisocyanates, such as 1,4-, 1,3- and 1,2-diisocyanatocyclohexane, 4,4'-di(isocyanatocyclohexyl)-methane, 1-isocyanato-3,3,5-trimethyl-5-(isocyanatomethyl)-cyclohexane (isophorone diisocyanate), and 2,4- and 2,6-diisocyanato-1-methylcyclohexane, and aromatic diisocyanates, such as 2,4-diisocyanatotoluene, 2,6-diisocyanatotoluene, tetra-methylxylylene diisocyanate, 1,4-diisocyanatobenzene, 4,4'- and 2,4-diisocyanatodiphenylmethane, p-xylylene diisocyanate, and also isopropenyldimethyltolylene diisocyanate.

The polyisocyanates having isocyanurate groups are in particular simple triisocyanatoisocyanurates, which are cyclic trimers of the diisocyanates, or mixtures with their higher homologs having more than one isocyanurate ring.

Uretdione diisocyanates are usually cyclic dimerization products of diisocyanates. The uretdione diisocyanates may, for example, be used as sole component or in a mixture with other polyisocyanates, in particular the polyisocyanates containing isocyanurate groups. Suitable polyisocyanates having biuret groups preferably have an NCO content of from 18 to 22% by weight and an average NCO functionality of from 3 to 4.5.

Polyisocyanates having urethane and/or allophanate groups may, for example, be obtained by reacting excess amounts of diisocyanates with simple, polyhydric alcohols, for example trimethylolpropane, glycerol, 1,2-dihydroxypropane or mixtures of these. These polyisocyanates having urethane and/or allophanate groups generally have an NCO content of from 12 to 20% by weight and an average NCO functionality of from 2.5 to 3.

Polyisocyanates containing oxadiazinetrione groups can be prepared from diisocyanate and carbon dioxide.

Suitable compounds having a reactive hydrogen, such as a hydroxyl, are the low-molecular-weight diols and polyols mentioned in connection with the preparation of polyesters, and also the polyestelpolyols, in particular polyesterdiols. Examples of polyesterpolyols are reaction products from the abovementioned di- or polybasic, preferably dibasic, carboxylic acids with polyhydric, preferably dihydric and, if desired, additionally trihydric alcohols. Examples of suitable starting components are the abovementioned polybasic carboxylic acids and polyhydric alcohols. The polyesterdiols may also be oligomers of lactones, such as β-propiolactone, γ-butyrolactone and ε-caprolactone, obtained by oligomerization of the lactones in the presence of starters based on the abovementioned low-molecular-weight diols. The abovementioned polyesterdiols or polyols generally have number-average molecular weights in the range from 500 to 5,000, preferably from 750 to 3,000.

In the broad practice of the invention, the radiation-curable formulation also may contain small amounts of additional polymer additives that do not cure by radiation, i.e., polymers with no ethylenically unsaturated, radiation-curable double bonds. Such polymers usually may be present in an amount of less than 10 wt. % of the formulation and should preferably have a relatively low glass transition temperature of below about 50° C., generally below about 40° C. Suitable polymers include those prepared by free-radical polymerization of ethylenically unsaturated monomers selected from vinylaromatic compounds, vinyl esters of aliphatic carboxylic acids having from 1 to 12 carbon atoms, $C_1$-$C_{10}$-alkyl acrylates and $C_1$-$C_{10}$-allyl methacrylates. Vinylaromatic monomers encompass in particular styrene, α-methylstyrene, vinyltoluenes and chlorostyrenes. The vinyl esters encompass in particular vinyl acetate, such as vinyl propionate. The acrylates and methacrylates respectively encompass the esters of acrylic and methacrylic acids with methanol, ethanol, n-propanol, isopropanol, n-butanol, isobutanol, tert-butanol, n-pentanol, n-hexanol, 2-ethylhexanol, n-octanol and cyclohexanol. The monomers to be polymerized also may encompass, as a co-monomer, up to 35% by weight, often only up to 20% by weight and in many cases only about from 0.1 to 10% by weight of acrylonitrile, methacrylonitrile, α-olefins, such as ethylene, propene and isobutene, dienes, such as butadiene and isoprene, vinyl chloride, vinylidene chloride, acrylic acid, methacrylic acid, itaconic acid, maleic acid, fumaric acid, the amides of these acids, the N-alkylolamides of these acids, in particular N-methylol(meth) acrylamide, hydroxyalkyl esters of these acids, in particular 2-hydroxyethyl (meth)acrylate and hydroxypropyl (meth)acrylate, and also ethylenically unsaturated sulfonic acids, eg. vinylsulfonic acid, styrenesulfonic acid and acrylamido-2-methylpropanesulfonic acid. These co-monomers are usually selected from acrylic acid, methacrylic acid, the amides of these, acrylamido-2-methylpropanesulfonic acid, acrylonitrile and methacrylonitrile.

The preparation of such polymers is well known and generally takes place by free-radical, aqueous emulsion polymerization of the abovementioned monomers in the presence of at least one free-radical polymerization initiator and, if desired, a surfactant selected from the class consisting of emulsifiers, and/or protective colloids.

In some cases, the physical properties of the radiation curable polymer makes it inconvenient and sometimes difficult to form a thin, uniform coating of the radiation curable formulation on the fibrous facing sheet of the gypsum panel. In this case, in addition to the radiation curable polymer component, the radiation curable formulation also may include a low-molecular-weight diluent or solvent, which itself preferably is capable of polymerization by cationic or free-radical pathways. The use of such an ingredient thus is especially useful in those circumstances where the viscosity of a particular radiation curable polymer does not readily allow the formation of a thin, uniform coating on the fibrous facing sheet. These additives are generally compounds that have at least one ethylenically unsaturated double bond and/or one epoxy group and have a molecular weight of less than about 800. As noted, such compounds are generally used to adjust to the desired working consistency of the radiation-curable formulation. This is particularly important in the present invention, as the formulation preferably should be essentially free of any non-reactive (volatile) diluents, such as water and/or inert organic solvents, (i.e., the formulation preferably contains such components only to such a small extent that it is not necessary to treat the coating formulation (e.g., by heat drying) to remove them). Such compounds are therefore also called reactive diluents. The proportion of any reactive diluents in the radiation curable formulation, based on the total amount of radiation curable polymer and reactive diluent in the radiation-curable formulation, is normally in the range from 0 to 60% by weight.

Examples of suitable reactive diluents are vinyl-group-containing monomers, in particular N-vinyl compounds, such as N-vinylpyrrolidone, N-vinylcaprolactam and N-vinylformamide, also vinyl ethers, such as ethyl vinyl ether, propyl vinyl ether, isopropyl vinyl ether, butyl vinyl ether, isobutyl vinyl ether, tert-butyl vinyl ether, amyl vinyl ether, 2-ethylhexyl vinyl ether, dodecyl vinyl ether, octadecyl vinyl ether and cyclohexyl vinyl ether, ethylene glycol mono- and divinyl ethers, di-, tri- and tetraethylene glycol mono- and divinyl ethers, polyethylene glycol divinyl ether, ethylene glycol butyl vinyl ether, triethylene glycol methyl vinyl ether, polyethylene glycol methyl vinyl ether, cyclohexanedimethanol mono- and divinyl ethers, trimethylolpropane trivinyl ether, aminopropyl vinyl ether, diethylaminoethyl vinyl ether and polytetrahydrofuran divinyl ether, vinyl esters, such as vinyl acetate, propionate, stearate and laurate, and vinylaromatics, such as vinyltoluene, styrene, 2- and 4-butylstyrene and 4-decylstyrene, and also acrylic monomers, eg. phenoxyethyl acrylate, tert-butylcyclohexyl acrylate and tetrahydrofurfuryl (meth)acrylate.

Compounds containing vinyl groups may also be used directly as cationically polymerizable reactive diluents. Further suitable compounds are compounds containing epoxy groups, such as cyclopentene oxide, cyclohexene oxide, epoxidized polybutadiene, epoxidized soybean oil, 3',4'-epoxycyclohexylmethyl 3,4-epoxycyclohexanecarboxylate and glycidyl ethers, eg. butanediol diglycidyl ether, hexanediol diglycidyl ether, bisphenol A diglycidyl ether and pentaerythritol diglycidyl ether, and the concomitant use of cationically polymerizable monomers such as unsaturated aldehydes and ketones, dienes, such as butadiene, vinylaromatics, such as styrene, N-substituted vinylamines, such as vinylcarbazole, and cyclic ethers, such as tetrahydrofuran, also is possible.

The reactive diluents also may include the esters of ethylenically unsaturated carboxylic acids with low-molecular-weight di- or polyhydric alcohols, preferably the acrylic and methacrylic esters and in particular the acrylic esters, the alcohols preferably having no further functional groups or, or at most ether groups, besides the hydroxyl groups.

Examples of such alcohols are ethylene glycol, propylene glycol and more highly condensed representatives of the class, e.g., diethylene glycol, triethylene glycol, dipropylene glycol and tripropylene glycol, butanediol, pentanediol, hexanediol, neopentyl glycol, alkoxylated phenolic compounds, such as ethoxylated and propoxylated bisphenols, cyclohexanedimethanol, alcohols having three or more hydroxyl groups, such as glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated, alcohols.

Well-known reactive diluents include the esterification products of the abovementioned di- or polyhydric alcohols with acrylic and/or methacrylic acid. Such compounds are generally termed polyacrylates or polyether acrylates. Hexanediol diacrylate, tripropylene glycol diacrylate and trimethylolpropane triacrylate are particularly suitable.

In one embodiment, such polyacrylates or polyether acrylates can be modified with primary and/or secondary amines. Suitable amines encompass both primary and secondary aliphatic amines, such as n-butylamine, n-hexylamine, 2-ethylhexylamine, dodecylamine, octadecylamine, di-n-butylamine, cycloaliphatic amines, such as cyclohexylamine, heterocyclic amines, such as piperidine, piperazine, 1-ethylpiperazine and morpholine, primary amines containing heterocyclic groups, for example N-(aminoethyl)imidazole, N-(aminoethyl)morpholine, tetrahydrofurylamine and 2-aminoethylthiophene. Other suitable compounds include alkanolamines, such as ethanolamine, 3-aminopropanol and monoisopropanolamine, and also alkoxyalkylamines, such as methoxypropylamine and aminoethoxyethanol. The molar ratio of amine groups to acrylate and/or methacrylate groups in the amine-modified polyacrylates or polyether acrylates is normally in the range from 0.01:1 to 0.3:1.

The radiation-curable formulation used according to the present invention, in principle, encompass any liquid or flowable (e.g. powder) preparation of a radiation curable polymer. Thus, pulverulent curable formulations also are encompassed, as known, for example, for powder-coating metallic surfaces. Hot-melt preparations, though less preferred, are also possible, these becoming flowable only at an elevated temperature. The radiation-curable formulation also may include the usual complement of auxiliaries, such as thickeners, flattening agents, flow control agents, surfactants, defoamers, UV stabilizers, emulsifiers and/or protective colloids and fillers. Suitable auxiliaries are well known to the person skilled in the art from coatings technology and in the aggregate are generally included in the formulation from about 0 to about 15 wt. %. Suitable fillers may include silicates, which are obtainable by hydrolyzing silicon tetrachloride, siliceous earth, talc, aluminum silicates, magnesium silicates, calcium carbonates, alumina, inorganic and organic pigments, etc. Suitable stabilizers encompass typical UV absorbers, such as oxanilides, triazines, benzotriazoles and benzophenones. These may be used in combination with usual free-radical scavengers, for example sterically hindered amines, eg. 2,2,6,6-tetramethylpiperidine and 2,6-di-tert-butyl-piperidine (HALS compounds). Stabilizers may optionally be used in amounts of from 0.1 to 5.0% by weight and preferably from 0.5 to 2.5% by weight, based on the polymerizable components present in the formulation.

When the formulation is stated to be cured by UV radiation, the formulation also includes at least one photoinitiator. A distinction needs to be made here between photoinitiators for free-radical curing mechanisms (polymerization of ethylenically unsaturated double bonds) and photoinitiators for cationic curing mechanisms (cationic polymerization of ethylenically unsaturated double bonds or polymerization of compounds containing epoxy groups). For curing by means of high-energy electrons (electron-beam curing), the use of photoinitiators may be dispensed with.

Suitable photoinitiators for free-radical photopolymerization, i.e., polymerization of ethylenically unsaturated double bonds, are benzophenone and benzophenone derivatives, such as 4-phenyl-benzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl benzoin ether, ethyl benzoin ether and butyl benzoin ether, benzil ketals, such as benzil dimethyl ketal, 2-methyl-1-[4-(methylthio)phenyl]-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl-2,4,6-trimethylbenzoylphenylphosphinate and bisacylphosphine oxides.

Suitable photoinitiators for cationic photopolymerization, i.e., the polymerization of vinyl compounds or compounds containing epoxy groups, are aryl diazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorophosphate, benzene- and toluenesulfonium hexafluorophosphate and bis[4-diphenylsulfoniophenyl]sulfide bishexafluorophosphate, disulfones, such as diphenyl disulfone and phenyl-4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes and titanocenium salts.

These photoinitiators are used, if required, in amounts of from 0.05 to 20% by weight, more usually from 0.1 to 10% by weight and most often from 1.0 to 5% by weight, based on the polymerizable components of the radiation curable formulation.

The radiation-curable formulation may also include polymers that have cationically polymerizable groups, in particular epoxy groups. These include copolymers of ethylenically unsaturated monomers, the copolymers containing, as comonomers, ethylenically unsaturated glycidyl ethers and/or glycidyl esters of ethylenically unsaturated carboxylic acids.

They also include the glycidyl ethers of hydroxyl-group-containing polymers, such as hydroxyl-group-containing polyethers, polyesters, polyurethanes and novolacs. They include moreover the glycidyl esters of polymers containing carboxylic acid groups. If it is desired to have a cationically polymerizable component, the radiation curable formulation may include, instead of or together with the cationically polymerizable polymer, a low-molecular-weight, cationically polymerizable compound, for example a di- or polyglycidyl ether of a low-molecular-weight di- or polyol or the di- or polyester of a low-molecular-weight di- or polycarboxylic acid, for example the cationically polymerizable reactive diluents specified above.

In the broad practice of the invention, formulation may alternatively include a thermal initiator, i.e., a compound responsive to heat radiation, in an amount equivalent to what has been suggested for photoinitiators.

Most radiation curable formulations suitable for use in accordance with the present invention will contain a photoinitiator, or thermal initiator in an amount of 1-5% by weight, an ethylenically unsaturated polymer, such as a urethane, epoxy, polyester or acrylate, in an amount of 20 to 99% by weight, a multifunctional acrylate in an amount of 0-60% by weight and other additives in an amount of 5-10% by weight. Of course, combinations of both photoinitiators and thermal initiators also can be used. In such a case, for example, the heat generated in a formulation due to the activity of a photoinitiator can cause activation of the thermal initiator.

According to the invention, the radiation-curable formulation is used to provide a coating on at least one fibrous facing sheet of a gypsum panel. For this, the radiation-curable formulation is applied in a known manner, eg. by spraying, trowelling, knife application, brushing, rolling or pouring onto the fibrous facing sheet of the gypsum panel. It is also possible that the formulation may be applied to the fibrous facing sheet of the gypsum panel by a hot-melt process or by a powder-coating process.

The amount of coating applied to the surface of the fibrous mat preferably should be sufficient to embed the surface of the mat completely in the coating, preferably to the extent that substantially no fibers protrude through the coating and preferably so that the coating is impervious to the passage of moisture (in either the liquid or vapor state). The amount of coating used may be dependent upon the nature of the fibrous mat. In some case it may be difficult to measure thickness of the coating, such as where the fibrous mat substrate on which the coating is applied is uneven.

The coating weight is usually in the range from 1 to 50 pounds per 1000 sq. ft. of gypsum panel, more often in the range from 2 to 25 pounds per 1000 sq. ft. of gypsum panel, based on the polymerizable components present in the formulation. The application may take place either at room temperature or at an elevated temperature, but preferably not at a temperature above 100° C., so as to avoid conditions that could contribute to undesired calcination of the gypsum core. Although higher or lower amounts of the radiation curable formulation can be used in any specific case, it is believed that, for most applications, the amount of powder coating will fall within the range of about 2 to about 25 lbs per 1000 sq. ft. of gypsum panel.

In rough terms, the thickness of the coating should be at least about 0.5 mils and is usually less than about 5 mils, but when the glass mat is relatively thin and the coating is efficiently dried, a coating as thin as 0.25 mils may suffice. In general, the thickness of the coating need not exceed about 5 mils and for most applications, a coating thickness of about 2 mils should usually prove to be sufficient.

Following application of a thin coating of the curable formulation to the fibrous facing sheet of the gypsum panel, the composition then is cured by passing the coated gypsum panel under a radiation source, e.g., a UV source, to form the radiation-cured, e.g., UV-cured polymer coated gypsum panel. The coated gypsum panel made in accordance with these teachings provides both a liquid and vapor barrier to water. The coating can be cured by exposure to high-energy radiation, preferably by UV radiation of wavelength from 250 to 400 nm or by irradiation with high-energy electrons (electron beams; from 150 to 300 kev). Examples of UV sources include high-pressure mercury vapor lamps. The radiation dose usually sufficient for crosslinking is in the range from 80 to 3,000 mJ/cm$^2$.

In another embodiment, especially suitable when the panel is intended to be used as a tile backer, an aggregate material is included in the radiation curable formulation, or is applied to the curable formulation that has been coated on a fibrous facing sheet. The purpose of the added aggregate is to provide the cured coating with sufficient surface roughness or other surface characteristics to promote or enhance the ability to adhere tiles or other surface treatments to the radiation cured coating. The nature of the aggregate can vary widely and this embodiment of the invention is not limited to any particular type or size of aggregate material. Embraced broadly within the terms "aggregate" are ceramic microspheres, glass microspheres, calcium carbonate, sand, aluminum oxide (alumina), crushed stone, glass fibers, gypsum, perlite, and other inorganic and organic aggregate materials readily recognized by those skilled in the art.

While the aggregate can be added to the curable coating formulation before it is coated onto the fibrous facing sheet, in the interest of limiting the amount used and concentrating it where it is most effective, it is preferred to add the aggregate material onto the curable coating formulation after it has been coated onto the fibrous facing sheet but before curing the coating. In this way, the aggregate material remains near the surface of the coating where it is needed to create a surface morphology conducive to bonding anyone of a number of surface treatments, such as ceramic tiles, to the gypsum panel. The amount of aggregate added to the coating can vary within wide limits and it is preferred to use only that amount needed to provide a suitable surface onto which an adequate bond can be made. For any particular aggregate material, a suitable level can be arrived at using only routine experimentation. As will be understood by skilled workers, the amount of aggregate to apply will be a function of the density of the aggregate used since the objective is to provide a surface coating of the aggregate on the coating, it not usually being necessary to complete permeate the depth of the coating with the aggregate. For low density material such as microspheres, generally, an amount of aggregate of about 1.25 pounds per 1000 sq. ft. should be suitable. For higher density materials, such as calcium carbonate, an amount of aggregate of about 15-40 lbs per 1000 sq. ft. should be suitable, with 20-35 lbs per 1000 sq. ft. being more preferred.

EXAMPLE 1

The following table illustrates several examples of radiation curable formulations suitable for coating a fibrous facing sheet of a gypsum panel.

| | POLYMER | | PHOTOINITIATOR | | REACTIVE DILUENT | |
|---|---|---|---|---|---|---|
| FORMULATION | Type | Amount (Wt. %) | Type | Amount (Wt. %) | Type | Amount (Wt. %) |
| 1 | Polybutadiene Methacrylate Oligomer | 97 | Benzil Dimethyl Ketone | 3 | — | — |
| 2 | Polybutadiene Methacrylate Oligomer | 97 | 2-hydroxyl-2-methyl-1-phenyl-propan-1-one | 3 | — | — |
| 3 | Polybutadiene Methacrylate Oligomer | 70 | 2-hydroxyl-2-methyl-1-phenyl-propan-1-one | 3 | Hexanediol diacrylate | 27 |
| 4 | Polybutadiene Methacrylate Oligomer | 66.3 | 2-hydroxyl-2-methyl-1-phenyl-propan-1-one | 3.3 | Hexafuncytional Urethane acrylate | 30.4 |
| 5 | Epoxy acrylate oligomer | 65.5 | 2-hydroxyl-2-methyl-1-phenyl-propan-1-one | 3.3 | Ethoxylated trimethylolpropane triacrylate | 30.5 |

Each formulation includes a photoinitiator and a radiation curable polymer.

EXAMPLE 2

The following table illustrates additional preferred examples of radiation curable formulations suitable for coating a fibrous facing sheet of a gypsum panel.

| FORMULATION | POLYMER | | PHOTOINITIATOR | | REACTIVE DILUENT | | FILLERS | |
|---|---|---|---|---|---|---|---|---|
| | Type | Amount (Wt. %) | Type | Amount (Wt. %) | Type | Amount (Wt. %) | Type | Amount (Wt. %) |
| 1 | Urethane Acrylate Oligomer | 35-55 | 2-hydroxyl-2-methyl-1-phenyl-propan-1-one | 1-5 | Hexanediol diacrylate | 15-20 | Barium Sulfate or Calcium Carbonate | 15-60 |
| 2 | Epoxy Acrylate Oligomer | 35-55 | 2-hydroxyl-2-methyl-1-phenyl-propan-1-one | 1-5 | Hexanediol diacrylate | 15-20 | Barium Sulfate or Calcium Carbonate | 15-60 |

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims. Unless otherwise specifically indicated, all percentages are based on UF resin solids. Throughout the specification and in the claims the term "about" is intended to encompass + or −5%.

The invention claimed is:

1. A method of making a gypsum panel comprising sandwiching a gypsum slurry between two moving sheets of facing material, one of said sheets comprising a fibrous facing material, curing and drying the gypsum slurry to form a set gypsum panel comprising a gypsum core, applying a coating of a radiation curable formulation, which is essentially free of any unreactive components, onto the fibrous facing material of the set gypsum panel, applying a surface coating of an aggregate material onto the coating of the radiation curable formulation, and curing the coating of the radiation curable formulation with high energy radiation, wherein the radiation curable formulation comprises a high energy radiation curable polymer comprising ethylenically unsaturated double bonds in an amount of about 0.35 moles to about 1.00 mole based on 100 grams of the high energy radiation curable polymer.

2. The method of claim 1 wherein the aggregate material is selected from ceramic microspheres, glass microspheres, calcium carbonate, sand, aluminum oxide, crushed stone, glass fibers, gypsum and perlite.

3. The method of claim 1, wherein the fibrous facing material comprises mineral fiber, resin fiber, cellulose fiber, or a combination comprising at least one of the foregoing.

4. The method of claim 1, wherein the high energy radiation is in ultraviolet wavelength.

5. The method of claim 4, wherein the ultraviolet wavelength is from about 250 nm to about 400 nm.

6. The method of claim 1, wherein the high energy radiation is high energy electrons.

7. The method of claim 6, wherein the high energy electrons have an energy of about 100 keV to about 350 keV.

8. The method of claim 1, wherein the gypsum core at least partially penetrates into the fibrous facing material.

9. The method of claim 1, wherein the radiation curable formulation is essentially free of water and comprises a high energy radiation curable reactive diluent.

10. The method of claim 9, wherein the high energy radiation curable polymer is urethane acrylate oligomer or epoxy acrylate oligomer, and the high energy radiation curable reactive diluent is hexanediol diacrylate.

11. The method of claim 9, wherein the at least one high energy radiation curable reactive diluent is present in an amount of about 20 wt % to about 60 wt % based on a total amount of the high energy radiation curable polymer and the high energy radiation curable reactive diluent in the radiation curable formulation.

12. The method of claim 1, wherein the gypsum core includes a water-resistant additive in an amount sufficient to improve the water-resistant properties of the gypsum core.

13. The method of claim 12, wherein the water-resistant additive comprises a wax emulsion, organopolysiloxane, siliconate, or a combination comprising at least one of the foregoing in an amount sufficient to improve the water-resistant properties of the gypsum core.

14. The method of claim 1, wherein the gypsum slurry is essentially void of starch.

15. The method of claim 1, wherein the radiation curable formulation comprises a photoinitiator present in an amount of about 0.05 wt % to about 20 wt % based on a total weight of polymerizable components in the radiation curable formulation.

16. The method of claim 1, wherein the high energy radiation curable polymer is present in the radiation curable formulation in an amount of about 20 wt % to about 99 wt % based on a total weight of the radiation curable formulation.

17. The method of claim 1, wherein the high energy radiation curable polymer comprises a thermal initiator in an amount of about 1 wt % to about 5 wt % based on a total weight of the radiation curable formulation.

18. The method of claim 1, further comprising reacting a polyfunctional compound comprising at least three reactive groups with a monofunctional or polyfunctional compound to produce the high energy radiation curable polymer comprising ethylenically unsaturated double bonds.

19. The method of claim 1, wherein the high energy radiation curable polymer comprises silicone, polyurethane, polyester, polyether, epoxy resin, melamine resin, (meth)acrylate polymer, or a combination comprising at least one of the foregoing.

20. The method of claim 1, wherein the high energy radiation curable polymer comprises an acryloxy group, methacryloxy group, acrylamido group, methacrylamido group, or a combination comprising at least one of the foregoing bonded to a backbone of the polymer either directly or through an alkylene group.

* * * * *